US010666316B2

(12) United States Patent
Churan

(10) Patent No.: US 10,666,316 B2
(45) Date of Patent: May 26, 2020

(54) WIRELESS COMMUNICATION SYSTEMS WITH CODE-DIVISION MULTIPLE ACCESS AND INTERFERENCE AVOIDANCE

(71) Applicant: ATC Technologies, LLC, Reston, VA (US)

(72) Inventor: Gary Churan, Annandale, VA (US)

(73) Assignee: ATC TECHNOLOGIES, LLC, Reston, VA (US)

(*) Notice: Subject to any disclaimer, the term of this patent is extended or adjusted under 35 U.S.C. 154(b) by 0 days.

(21) Appl. No.: 16/206,606

(22) Filed: Nov. 30, 2018

(65) Prior Publication Data

US 2019/0165827 A1 May 30, 2019

Related U.S. Application Data

(60) Provisional application No. 62/592,887, filed on Nov. 30, 2017.

(51) Int. Cl.
*H04B 1/715* (2011.01)
*H04W 16/14* (2009.01)
*H04B 1/707* (2011.01)
*H04L 27/00* (2006.01)

(52) U.S. Cl.
CPC ............ *H04B 1/715* (2013.01); *H04B 1/707* (2013.01); *H04L 27/0006* (2013.01); *H04W 16/14* (2013.01)

(58) Field of Classification Search
CPC ....... H04B 1/715; H04B 1/707; H04W 16/14; H04L 27/0006; H04L 27/26
See application file for complete search history.

(56) References Cited

U.S. PATENT DOCUMENTS

| 2005/0281321 A1 | 12/2005 | Bergstrom et al. |
| 2006/0274817 A1 | 12/2006 | Lakkis |
| 2008/0212650 A1* | 9/2008 | Hwang ............... H04B 1/71635 375/130 |
| 2009/0161614 A1 | 6/2009 | Grandblaise et al. |

(Continued)

OTHER PUBLICATIONS

PCT/US2018/063402 International Search Report and Written Opinion dated Feb. 26, 2019 (19 pages).

*Primary Examiner* — Jean B Corrielus
(74) *Attorney, Agent, or Firm* — Michael Best & Friedrich LLP

(57) ABSTRACT

The present disclosure includes wireless communication systems with code-division multiple access with interference avoidance (CDMA-IA). In one embodiment, the wireless communication system includes a plurality of transmitters and a plurality of receivers. At least one transmitter of the plurality of transmitters is configured to detect unoccupied segments of spectrum occupancy of interference at one of the plurality of receivers, and spread power of a transmitted signal non-uniformly across a channel bandwidth that is much wider than an information bandwidth of the transmitted signal using a plurality of non-contiguous spectral segments that correspond to the unoccupied segments of the spectrum occupancy of the interference at the one of the plurality of receivers. At least one receiver of the plurality of receivers is configured to perform a demodulation process by coherently integrating the power of the transmitted signal over the plurality of non-contiguous spectral segments.

28 Claims, 10 Drawing Sheets

(56) References Cited

U.S. PATENT DOCUMENTS

| | | |
|---|---|---|
| 2011/0171920 A1 | 7/2011 | Kim et al. |
| 2013/0267265 A1* | 10/2013 | Beadle .................. H04W 16/14 455/501 |
| 2016/0065265 A1* | 3/2016 | Hassan .................... H04B 1/69 375/130 |
| 2016/0066214 A1 | 3/2016 | Buddhikot et al. |
| 2016/0088486 A1* | 3/2016 | Taher .................... H04W 16/14 455/454 |
| 2017/0238189 A1* | 8/2017 | Nolan .................. H04W 16/14 370/328 |
| 2018/0115652 A1* | 4/2018 | Russell .................. H04L 69/16 |

* cited by examiner

WIRELESS COMMUNICATION SYSTEMS WITH CODE-DIVISION MULTIPLE ACCESS AND INTERFERENCE AVOIDANCE

CROSS-REFERENCE TO RELATED APPLICATION

This application claims the benefit of U.S. Provisional Application No. 62/592,887, filed on Nov. 30, 2017, the entire content of which is hereby incorporated by reference.

FIELD OF INVENTION

The present disclosure relates generally to wireless communication systems. More specifically, the present disclosure relates to a wireless communication system with code-division multiple access and interference avoidance ("CDMA-IA communication system").

BACKGROUND

Conventionally, CDMA has been used to overcome non-white interference—the spread spectrum nature of CDMA increases the signal-to-noise plus interference ratio (SNIR) at the point of bit decision in the receiver via the processing gain resulting from spectrum spreading and de-spreading. However, the conventional method both accepts some interference from other users and causes some interference to others, albeit relatively small depending on the processing gain. In some applications, the above reduction of mutual interference by conventional spread spectrum processing may be insufficient to meet the SNIR requirement.

Additionally, there are some conventional spread spectrum methods, such as Bluetooth™, where the spectrum of non-white interference is avoided in the design of the transmit signal. For example, the Bluetooth™ system can sense the presence of non-white interference and avoid using spectra occupied by the interference in selecting its own frequency hopping pattern. However, Bluetooth™ uses non-coherent frequency hopping, that is, in the process of making bit decisions, signal energy is not coherently integrated over multiple frequency hops. Conventional non-coherent spread spectrum systems offer inferior performance as the available signal energy is used sub-optimally.

SUMMARY

The present disclosure includes, among other embodiments set forth below, a wireless communication system that has a plurality of transmitters and a plurality of receivers. At least one transmitter of the plurality of transmitters is configured to detect unoccupied segments of spectrum occupancy of interference at one of the plurality of receivers. The at least one transmitter of the plurality of transmitters is also configured to spread energy of a transmitted signal non-uniformly across a channel bandwidth that is much wider than an information bandwidth of the transmitted signal using a plurality of non-contiguous spectral segments that correspond to the unoccupied segments of the spectrum occupancy of the interference at the one of the plurality of receivers. At least one receiver of the plurality of receivers is configured to perform a demodulation process by coherently integrating the energy of the transmitted signal over the plurality of non-contiguous spectral segments. In this embodiment, the bit error rate performance is substantially independent of the number of spectral segments utilized.

The interference exposures are reduced in a wireless communication system according to the present disclosure because energy of the transmitted signal fills in the available spectrum of a congested band in an optimal, water-filling manner. Specifically, a wireless communication system of the present disclosure uses a process referred to herein as "Code Division Multiple Access with Interference Avoidance," or CDMA-IA. The CDMA-IA wireless communication system utilizes a common wideband channel (also referred to as "common wireless wideband channel"), through which several radio links, each operating between a pair of network radio nodes, are operated simultaneously using frequency-overlaid transmission. These radio links use different pseudo-noise spreading codes so that they may be separated at the receivers by means of spread spectrum processing. The wideband channel bandwidth may also carry overlaid transmissions from other sources external to the CDMA-IA network residing in the same wideband channel without causing unacceptable radio frequency (RF) interference to or be subject to unacceptable interference from the CDMA-IA network.

As a part of the method of operation of CDMA-IA, periodic measurements of received interference power spectral density (PSD) are made by each network radio node. These measurements are used to produce a Spectrum Usability Mask (see FIG. 3) that indicates which frequency segments within the common wideband channel may be used without causing excessive interference to other existing carriers or be subject to excessive interference from such carriers. The Spectrum Usability Masks may be shared among other network radio nodes over a broadcast and control channel that is used to facilitate network management and interference avoidance. The present disclosure also provides a separate control channel for sharing information with other networks operating in the common wideband channel, wherein such information may be used for inter-network collaboration. This inter-network control channel terminates in a designated gateway radio node (GRN), which acts as the single point of contact for information sharing between the CDMA-IA network and other networks sharing the common wideband channel.

In another embodiment, the present disclosure includes a wireless communication system. The wireless communication system includes a plurality of radio nodes, each radio node of the plurality of radio nodes is configured to transmit wireless signals to the plurality of radio nodes of a first wireless network, and receive wireless signals from the plurality of radio nodes of the first wireless network, the first wireless network sharing a common wideband wireless channel with at least one of a plurality of other wireless networks. At least one radio node of the plurality of radio nodes of the first wireless network includes a spectrum sensing processor that is configured to determine spectrum occupancy information about the common wideband wireless channel from the wireless signals that are received by the at least one radio node, a Spectrum Usability Mask processor that is configured to generate a first Spectrum Usability Mask based on the spectrum occupancy information, the first Spectrum Usability Mask indicating usable spectral segments in the common wideband wireless channel with respect to a location of the at least one radio node, a broadcast and control channel processor that is configured to transmit the first Spectrum Usability Mask to a plurality of other radio nodes in the first wireless network, and a traffic data channel processor and the broadcast and control channel processor are configured to transmit traffic and control information to a plurality of destination radio nodes in the first wireless network.

In another embodiment, a radio node is provided. The radio node includes a server including circuitry and memory. The server is configured to determine spectrum occupancy information about a common wideband wireless channel from wireless signals that are received by the radio node, generate a first Spectrum Usability Mask based on the spectrum occupancy information, the first Spectrum Usability Mask indicating usable spectral segments in the common wideband wireless channel with respect to a location of the radio node, transmit the first Spectrum Usability Mask to a plurality of other radio nodes in a first wireless network, and transmit traffic and control information to a plurality of destination radio nodes in the first wireless network.

In another embodiment, a wireless communication method is provided. The wireless communication method includes determining, with a server, spectrum occupancy information about a common wideband wireless channel from wireless signals that are received by a radio node of a first wireless network. The wireless communication method includes generating, with the server, a first Spectrum Usability Mask based on the spectrum occupancy information, the first Spectrum Usability Mask indicating usable spectral segments in the common wideband wireless channel with respect to the location of the radio node. The wireless communication method includes transmitting, with the server, the first Spectrum Usability Mask to a plurality of other radio nodes in the first wireless network. The wireless communication method includes receiving, with the server, a plurality of second Spectrum Usability Masks transmitted by a plurality of destination radio nodes in the first wireless network. The wireless communication method also includes transmitting, with the server, traffic and control information to the plurality of destination radio nodes in the first wireless network based on the plurality of second Spectrum Usability Masks.

Additionally, in some embodiments, the method further includes incorporating sufficient coding redundancy in the design of the signal to be transmitted, that the received signal can be decoded with acceptable quality, in spite of certain spectral segments of the signal to be transmitted being masked by the second Spectrum Usability Mask of the receiver. In the present context, the signal to be transmitted is the signal that would be transmitted if all its spectral segments were unmasked as per the second Spectrum Usability Mask at the receiver.

In yet another embodiment, a non-transitory computer-readable medium is provided. The non-transitory computer-readable medium includes instructions that, when executed by a server, cause the server to perform a set of operations. The set of operations includes determining spectrum occupancy information about a common wideband wireless channel from wireless signals that are received by a radio node of a first wireless network. The set of operations includes generating a first Spectrum Usability Mask based on the spectrum occupancy information, the first Spectrum Usability Mask indicating usable spectral segments in the common wideband wireless channel with respect to the location of the radio node. The set of operations includes transmitting the first Spectrum Usability Mask to a plurality of other radio nodes in the first wireless network. The set of operations includes receiving a plurality of second Spectrum Usability Masks transmitted by a plurality of destination radio nodes in the first wireless network. The set of operations also includes transmitting traffic and control information to the plurality of destination radio nodes in the first wireless network based on the plurality of second Spectrum Usability Masks.

Additionally, in some embodiments, a low-level spread-spectrum pilot signal is transmitted by each transmitting radio node in the same wideband channel as the CDMA-IA. signals. The pilot signal is comprised of a known repeating PN-sequence, which is unique for each radio node, whose transmitted symbols are time and frequency aligned with the corresponding transmitted CDMA-IA symbols. The receiving radio node acquires the known pilot signal using conventional de-spreading methods, thereby facilitating acquisition and synchronization to the received. CDMA-IA signal.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced, or carried out, in various ways.

Figure 1:
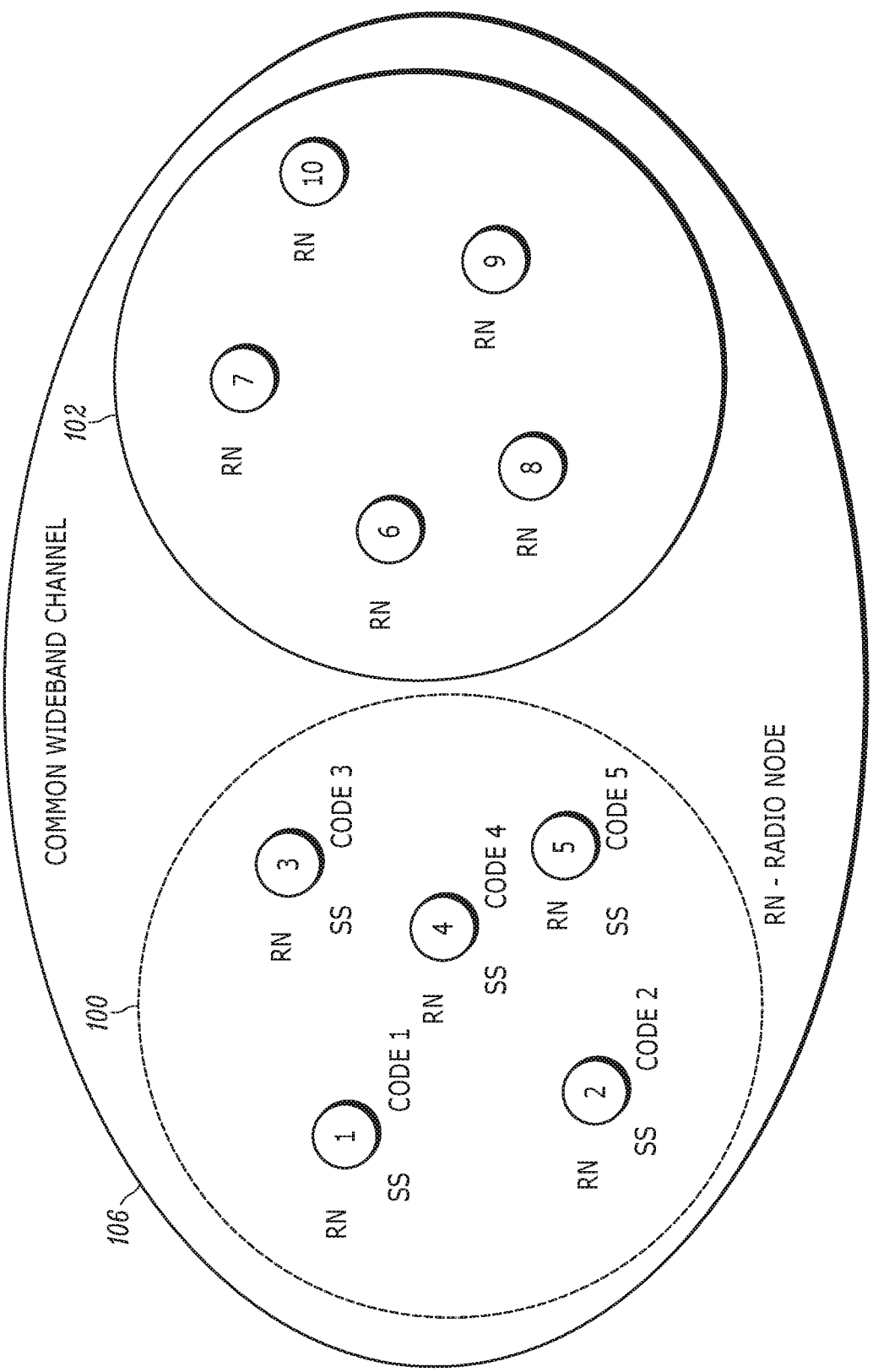
FIG. 1 is a diagram illustrating two radio networks sharing a common wideband channel.

FIG. 1 is a diagram illustrating two radio networks 100 and 102 sharing a common wideband channel 106. Radio network 100 represents a CDMA-IA network, whereas the radio network 102 may use CDMA-IA or a different type of wireless modulation in the example of FIG. 1, the radio network 100 includes five radio nodes, for example, radio node (RN) 1, radio node 2, radio node 3, radio node 4, and radio node 5. Each node may be configured to support both transmit and receive functionality. Each transmission identification of the five radio nodes is uniquely tied to a unique subset of spread spectrum (SS) codes (for example, RN 1 is assigned SS Codes 1, 2, and 3 and RN 2 is assigned SS codes 4, 5, etc.) among the radio nodes within the radio network 100. The SS codes assigned to each node are known and identifiable by all other nodes in the CDMA-IA radio network 100.

Additionally, in the example of FIG. 1, the radio network 102 includes another five radio nodes, for example, radio node 6, radio node 7, radio node 8, radio node 9, and radio node 10. The radio network 102 is a completely independent network from radio network 100 and may be assigned spectrum that overlaps with the spectrum assigned to the radio network 100. In some embodiments, the radio network 102 may use the same broadcast and control schemas as described with respect to the radio network 100. In other embodiments, the radio network 102 may use different broadcast and control schemas as described with respect to the radio network 100.

In some embodiments, a relatively low power spread-spectrum pilot signal is transmitted by each transmitting radio node in the same wideband channel 106 as the CDMA-IA signals. The pilot signal is comprised of a known repeating PN-sequence, which is unique for each radio node, whose transmitted symbols are time and frequency aligned with the corresponding transmitted CDMA-IA symbols. The receiving radio node acquires the known pilot signal using conventional de-spreading methods, thereby facilitating acquisition and synchronization to the received CDMA-IA signal. The power of the pilot signal may be optimized to minimize the probability of interference caused by the pilot signal while maximizing the probability of acquisition and synchronization of the CDMA-IA signals.

Figure 2:
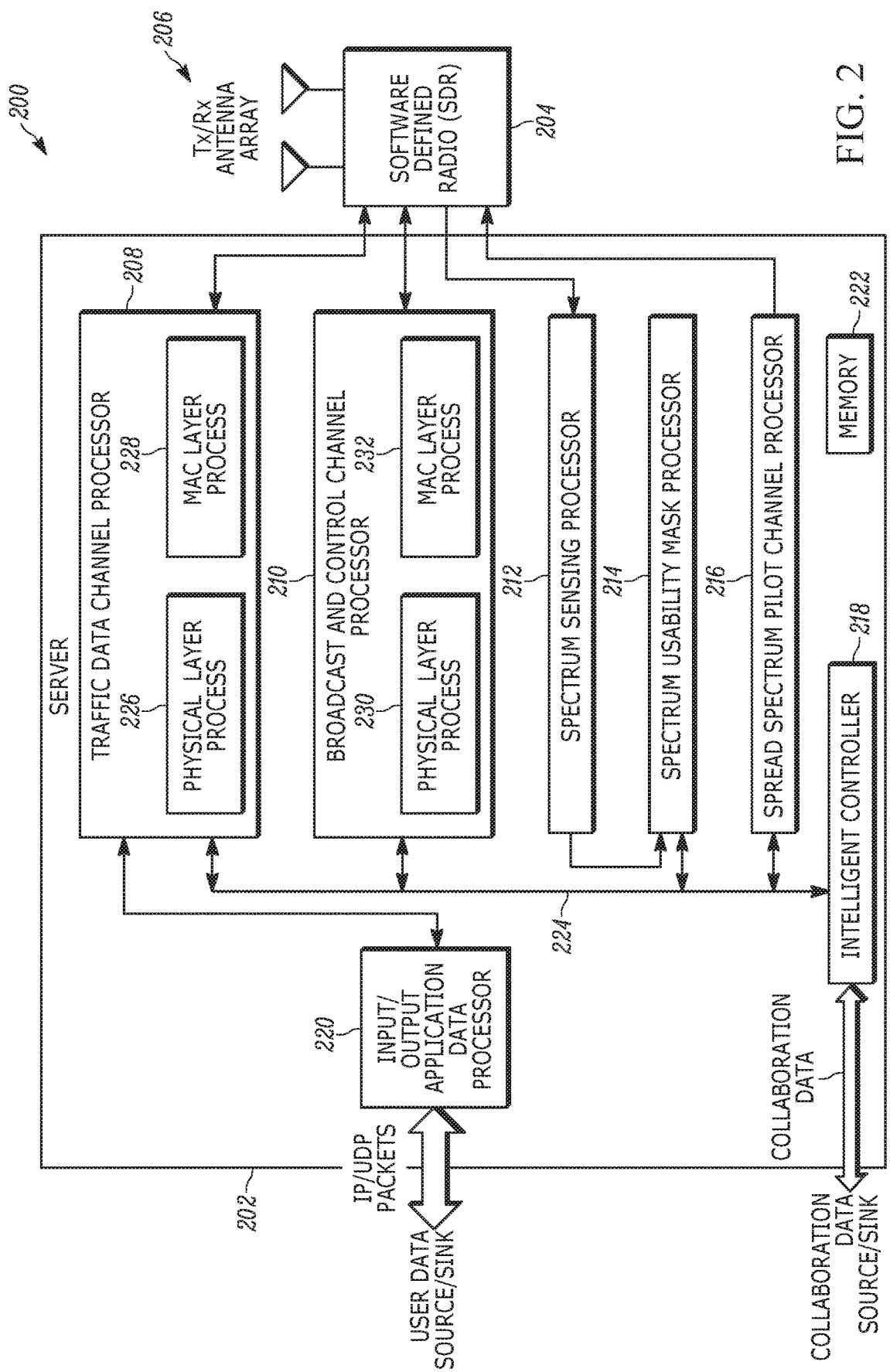
FIG. 2 is a block diagram illustrating an example radio node architecture.

FIG. 2 is a block diagram illustrating an example of a radio node architecture 200. Other architectures can also deliver the same functionality and are equally covered by the functionality described herein. In the example of FIG. 2, the radio node architecture 200 includes a server 202, which is communicatively and bi-directionally coupled to a software defined radio (SDR) 204, connected to an array of transmit/receive antennas 206. As illustrated in FIG. 2, the server 202 includes a traffic data channel processor 208, a broadcast and control channel processor 210, a spectrum sensing processor 212, a Spectrum Usability Mask processor 214, a spread spectrum pilot channel processor 216, an intelligent controller 218, an input/output application data processor 220, a memory 222, and a communication bus 224.

The SDR 204 performs frequency translation between the complex baseband form of the signal at the server interface and the analog form of the signal at RF, which exists at the antenna interface. The complex baseband (digital I and Q) signals are generated by the server 202, which may comprise a combination of digital signal processors (DSPs), general purpose processing units (GPUs) and application specific integrated circuits (ASIC), together with program and data memory resources 222. Typically, data memory, used for the storage of temporary data, is transitory and program memory, used to store instructions executed by the server 202, is non-transitory. The focus of the present description is on the functional architecture of the server 202. The "processors" that make up the overall functionality of server 202 are implemented in software using the hardware resources (processor and memory) available on the server 202. Stated differently, "processor" is a functional element which executes the indicated process. The process may be implemented utilizing a combination of hardware and software enabling means, including wholly in software on a general purpose electronic processor, or server, without departing from the teachings or the scope of the present disclosure. The functional architecture is described below.

An input/output application data processor 220 performs formatting functions on the input and output data, which is typically presented at the interface as IP or UDP packets. A traffic data channel processor 208 executes the physical and media-access control (MAC) layer processes of the chosen communication protocol stack for both transmit and receive; the physical layer and MAC layer processes are shown as processes 226 and 228, respectively. A broadcast and control channel processor 210 generates and receives broadcast and control channel data. Like the traffic data channel processor 208, the broadcast and control channel processor 210 also includes a physical layer process 230 and a MAC layer process 232. A spread spectrum pilot channel processor 216 generates the pilot channel used for time and frequency synchronization of the transmitted signal at the destination receiver; a spectrum sensing processor 212 estimates the spectrum occupancy of the wireless wideband channel. A Spectrum Usability Mask processor 214 generates a usability mask from the spectrum occupancy sensed by the spectrum sensing processor 212.

In some embodiments, the radio node architecture 200 may include fewer or additional components in configurations different from that illustrated in FIG. 2. Also, the radio node architecture 200 may perform additional functionality to the functionality described herein.

In some embodiments, at each radio node, the local spectrum sensing information is generated by the spectrum sensing processor 212 by processing the received signal provided by the SDR 204. Based on the sensing information, a Spectrum Usability Mask (e.g., a first Spectrum Usability Mask) is created by the Spectrum Usability Mask processor 214. The Spectrum Usability Mask may be transmitted via the broadcast and control channel processor 210 to other nodes that communicate with the present radio node.

The broadcast and control channel processor 210 of the present radio node also receives Spectrum Usability Masks from other nodes to which it may send data. For each destination node, the transmitting node selectively apportions the transmitted signal power within the unmasked portions of spectrum existing at the destination node, thereby avoiding other-network carriers occupying the masked carrier's spectrum, using an approach to optimize signal design similar to "water-filling." Through this approach, the CDMA-IA network's receiving nodes receive relatively interference-free signals on the unmasked spectral segments at the location of the receiving node. Furthermore, other networks' receivers located in the vicinity of the CDMA-IA network's receiver are also protected from interference from the CDMA-IA network because the other-network receivers are receiving signals in the masked segments.

In some examples, other-network receivers may exist where CDMA-IA network receivers are absent. The methods described above, up to this point, would not protect such receivers. However, the above methods may be extended to the other-network receivers as described in the two examples below.

In a first example, the other networks communicate the desired signal spectra and locations of each of its receivers to the CDMA-IA network's GRN through a collaboration backchannel, which comprises a communication channel that is separate from the CDMA-IA wireless network. If it is desired to protect these other networks, estimates are made, using propagation models, of whether harmful interference would be caused to the other network's receivers by transmitting at the power level necessary to reach the CDMA-IA network's own receivers. If it is determined that the potential for interference exists, then additional spectral segments may be masked out in the transmitted signal beyond those determined by the Spectrum Usability Mask at the CDMA-IA network's own receivers.

In a second example, spectral segments may be masked by a CDMA-IA transmitting node, wherein the masked segments correspond to the transmitting node's own, i.e. locally generated, Spectrum Usability Mask. This may protect proximate, other network receivers that are using the masked spectral segments. The advantage of the second example over the first example is that no feedback from the other networks is required by the second example.

In a wireless mesh network, certain nodes may be "hidden" from certain nodes because of excess propagation loss. For a decentralized network architecture, when hidden radio nodes exist as described above, a given radio node may broadcast not only the Spectrum Usability Mask at the location of the given radio node but also rebroadcasts the Spectrum Usability Masks received from other radio nodes in listening range. This can facilitate multi-hop relay operation between source and destination nodes that cannot communicate directly but can do so using intermediate relay nodes wherein each hop has acceptably low propagation loss.

In some examples, each radio node, including a gateway node, may use the Spectrum Usability Mask processor 214 to generate the Spectrum Usability Mask. Accordingly, in a centralized network architecture, the gateway radio node makes a determination of which spectrum segments are allocated to transmissions by each network node, based on the Spectrum Usability Masks received from the other nodes, and conveys this control information to the other transmitting nodes over the broadcast and control channel. In a distributed network architecture, each transmitting node independently determines which spectrum segments it will use based on the Spectrum Usability Mask data received from the other nodes over the broadcast and control channel and/or its own local Spectrum Usability Mask.

Figure 3:
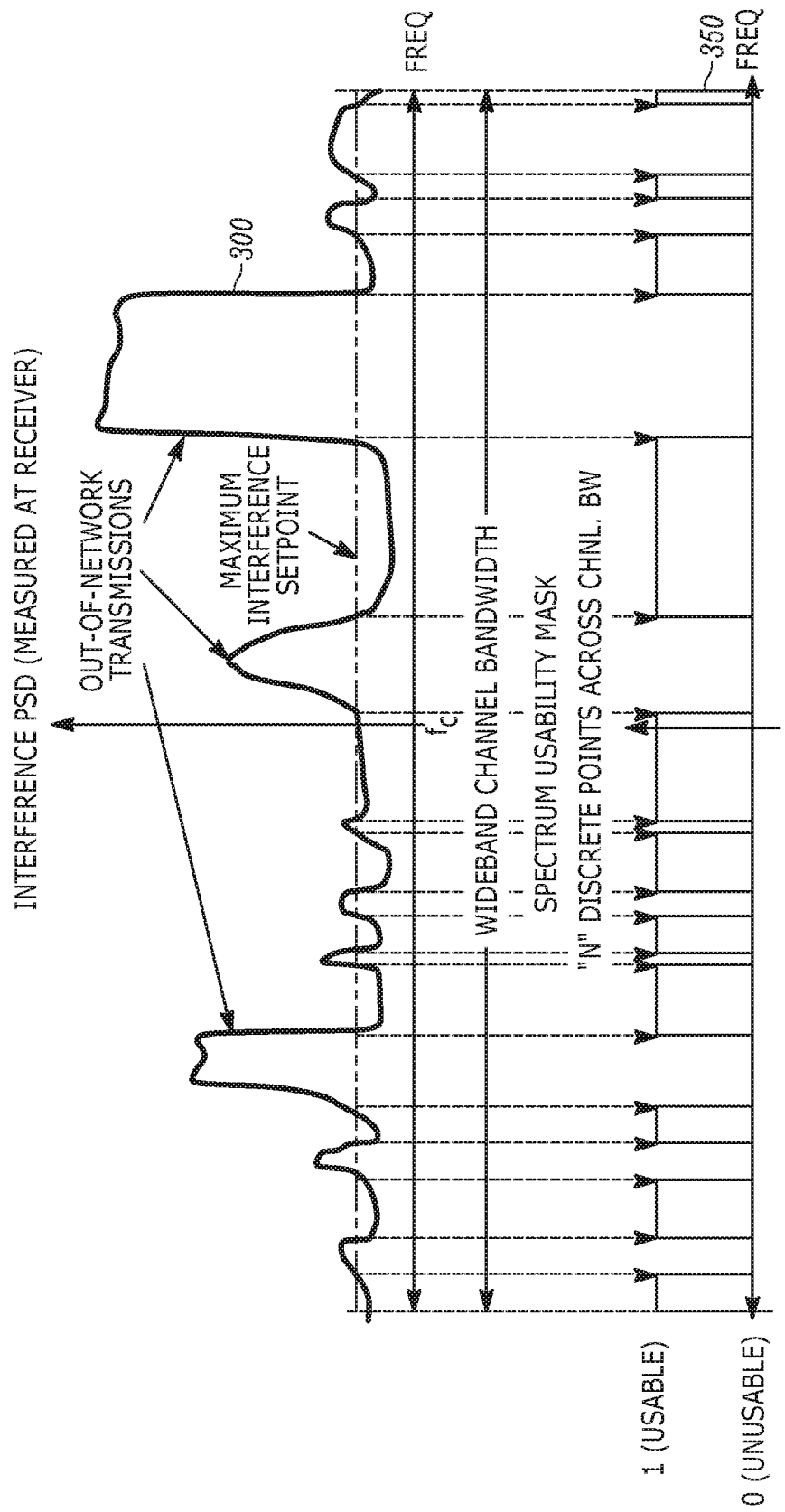
FIG. 3 is a diagram illustrating an example of radio frequency (RF) interference distribution and a corresponding Spectrum Usability Mask.

FIG. 3 is a diagram illustrating an example of radio frequency (RF) interference distribution 300 and a corresponding Spectrum Usability Mask 350. In the example of FIG. 3, the RE interference distribution 300 is the power spectral density (PSI)) interference across the wideband channel bandwidth measured by a radio node. In the example of FIG. 3, the Spectrum Usability Mask 350 comprises "N" discrete measurement points across the wideband channel bandwidth generated by the Spectrum Usability Mask processor 214.

Each measurement point of the "N" discrete measurement points is set to 1 when the corresponding point in the PSD interference is equal to or below a maximum interference threshold. The measurement points of the "N" discrete measurement points set to 1 are indicative of usable spectrum. Conversely, each measurement point of the "N" discrete measurement points is set to 0 when the corresponding point in the PSD interference exceeds the maximum interference threshold. The measurement points of the "N" discrete measurement points set to 0 are indicative of spectrum that is not usable, i.e., when the corresponding PSI) interference levels exceed the maximum interference set point. As illustrated in FIG. 3, the Spectrum Usability Mask 350 is generated by the Spectrum Usability Mask processor 214 from a combination of the usable and non-usable measurement points.

Figure 4:
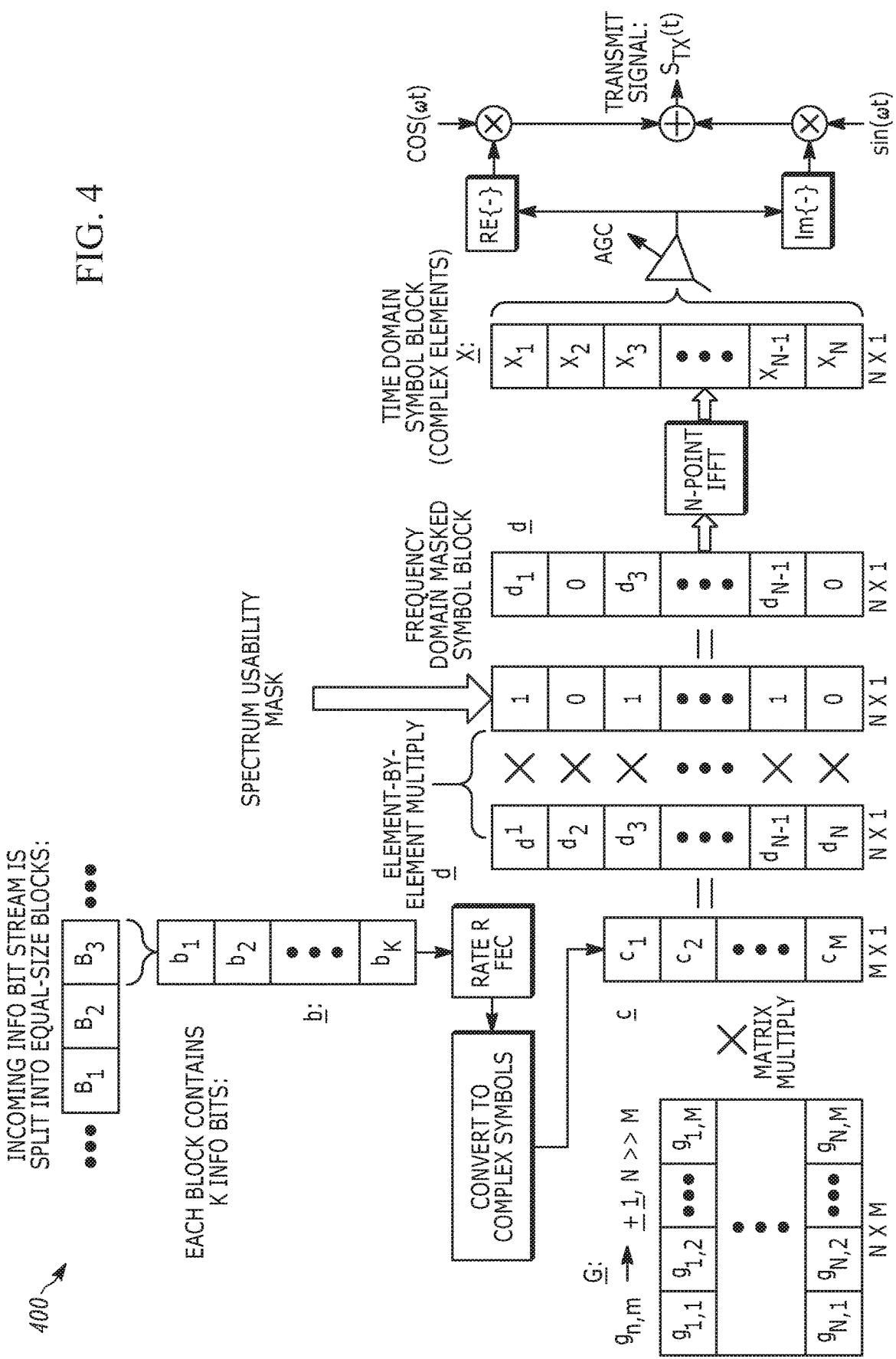
FIG. 4 is a diagram illustrating a process for transmission-side CDMA-IA signal processing at a transmitting radio node.

FIG. 4 is a diagram illustrating a process 400 for transmission-side CDMA-IA signal processing at a transmitting radio node. In the example of FIG. 4, similar to OFDM, the process 400 includes generating transmit symbols in the frequency domain, and then transforming the transmit symbols to the time domain using an Inverse Fast Fourier transform (IFFT). The process 400 facilitates identifying the interference-containing frequencies in the wideband channel and marking them as unusable in the Spectrum Usability Mask 350 shown in FIG. 3.

In the example of FIG. 4, the process 400 splits incoming information into equal size blocks to form vector b with K info bits. The vector b is applied to a Rate-R FEC encoder (where R is the ratio of the number of information bits to the number of coded bits in the vector b), followed by conversion of coded binary bits to complex QAM symbols, to generate a vector c with M complex FEC-encoded symbols.

In the example of FIG. 4, the process 400 implements spectrum spreading by matrix-multiplication of the M, FEC-encoded, quadrature amplitude modulated (QAM) data symbols in vector c, by a pseudo-random spreading matrix G with N (>M) rows and M columns, where each element of the matrix is represented as a bipolar (+/−1) symbol, and where different uncorrelated PN-sequences are assigned to G for each transmission channel. QAM signals are created from binary (0 and 1) signals in b by collecting the binary symbols into groups of N, and performing QAM modulation according to methods known in the prior art. One embodiment of this method is binary, polar modulation, where N=1 and the modulated signals are +1 and −1. Other embodiments may include quadrature phase shift keying (QPSK) for N=2, 8PSK for N=3 and other arbitrary QAM for arbitrary values of N, where the modulated signals are at complex baseband, containing real and imaginary components, rather than being purely real, as in the case of binary polar modulation.

The post-spreading block of N symbols has the frequency-domain equivalence of spanning the entire wideband channel. The matrix multiplication of pseudo-random spreading matrix G and the vector c generates a vector d with N symbols.

In the example of FIG. 4, the process 400 performs element by element multiplication of the vector d and the Spectrum Usability Mask 350 (for example, the Spectrum Usability Mask 350 being received from another radio node over the control channel) to mask the vector d to form a frequency-domain, masked symbol block. The frequency domain masked symbol block is input into an N-point IFFT to generate a vector x, which is a time domain symbol block with complex elements. The vector x is transmitted as a signal STx(t) with a transmitter including automatic gain control (AGC).

In the example of FIG. 4, the matrix multiplication of vector c symbols by matrix G provides redundancy in the frequency domain, which allows all data bits to be recovered even if some frequencies are masked-out by the Spectrum Usability Mask 350.

Figure 5:
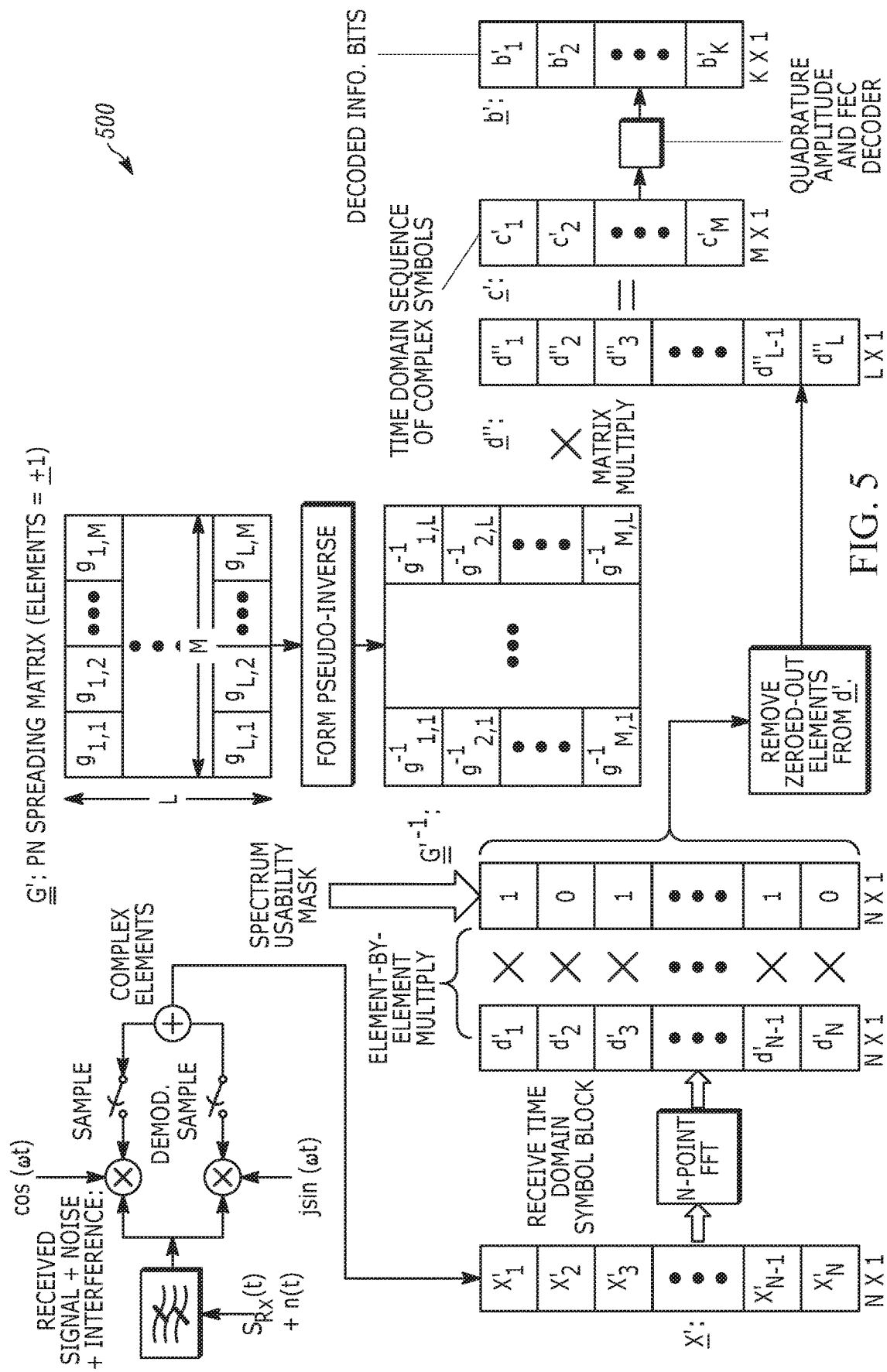
FIG. 5 is a diagram illustrating a process for reception-side CDMA-IA signal processing at a receiving radio node.

FIG. 5 is a diagram illustrating a process 500 for reception-side CDMA-IA signal processing at a receiving radio node. In the example of FIG. 5, the process 500 is mostly the reverse of the process 400 described above. One difference between the process 500 and the process 400 is the removal of zeroed-out elements from d' to generate a vector d", which is the result of matrix multiplication with the Spectrum Usability Mask 350. Another difference is the removal of rows from matrix G' that correspond to the positions of the non-usable points, or frequencies the zeros), in the Spectrum Usability Mask 350 and forming the pseudo-inverse matrix G'-l. L denotes the number of rows remaining in the matrix G'.

The formation of the vector d" and the pseudo-inverse matrix G'-1 allows for matrix multiplication to generate the vector c'. The vector c' includes a time domain sequence of complex symbols that may be demodulated using a QAM demodulator and decoded with an FEC decoder, to generate the decoded information bits in vector b'. The process of post-multiplying the pseudo-inverse matrix G'-1 by vector d" results in the coherent integration, or despreading, of the received signal power from the spread bandwidth, which is the bandwidth of the sum of all unmasked (i.e. the utilized) spectral segments.

Figure 6:
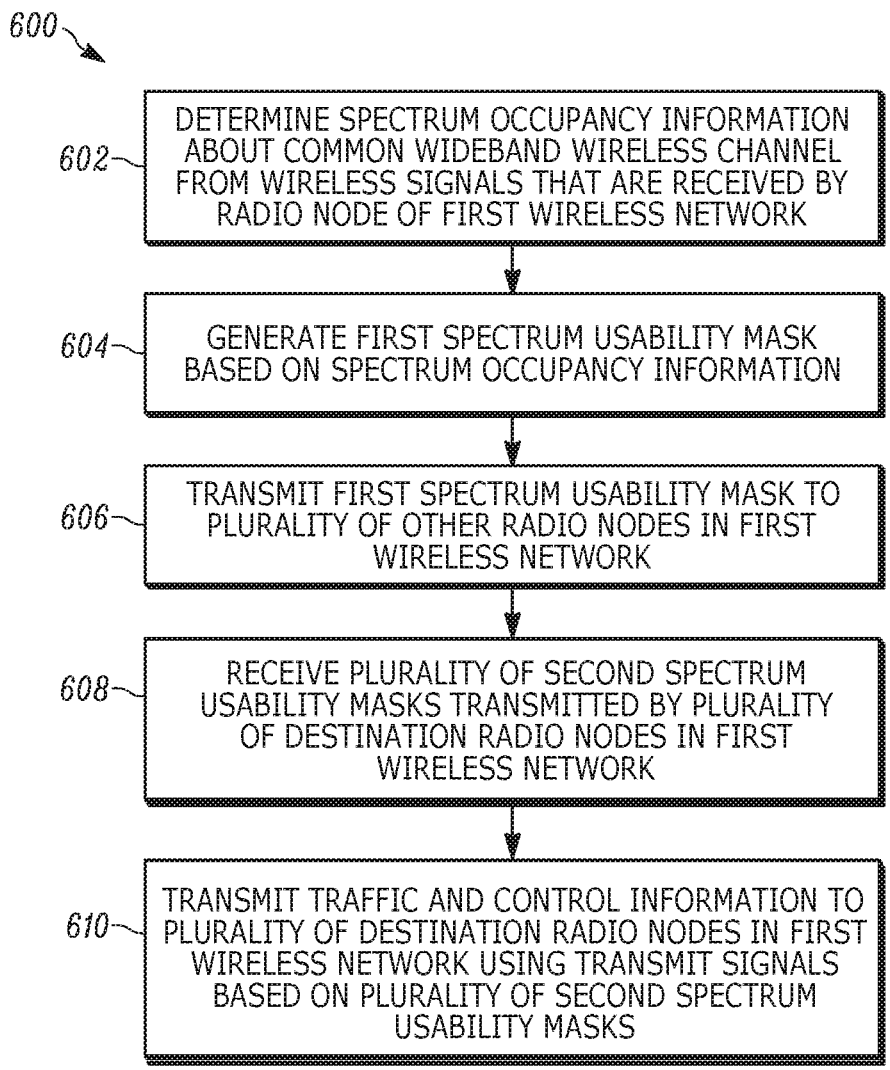
FIG. 6 is a block diagram illustrating a first wireless communication method.

FIG. 6 is a block diagram illustrating a first wireless communication method 600. As illustrated in FIG. 6, the method 600 includes determining, with a server, spectrum occupancy information about a common wideband wireless channel from wireless signals that are received by a radio node of a first wireless network (at block 602). The method 600 includes generating, with the server, a first Spectrum Usability Mask based on the spectrum occupancy information, the first Spectrum Usability Mask indicating usable spectral segments in the common wideband wireless channel with respect to a location of the radio node (at block 604). The method 600 includes transmitting, with the server, the first Spectrum Usability Mask to a plurality of other radio nodes in the first wireless network (at block 606). The method 600 includes receiving, with the server, a plurality of second Spectrum Usability Masks transmitted by a plurality of destination radio nodes in the first wireless network (at block 608). The method 600 also includes transmitting, with the server, traffic and control information to the plurality of destination radio nodes in the first wireless network using transmit signals based on the plurality of second Spectrum Usability Masks (at block 610).

Figure 7:
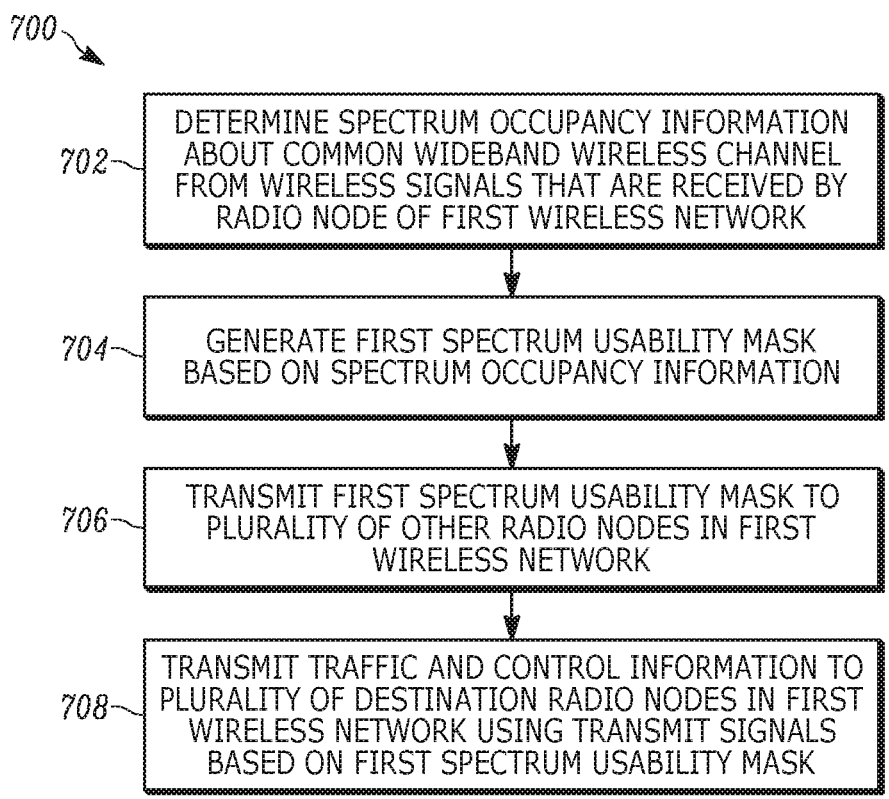
FIG. 7 is a block diagram illustrating a second wireless communication method.

FIG. 7 is a block diagram illustrating a second wireless communication method 700. As illustrated in FIG. 7, the method 700 includes determining, with a server, spectrum occupancy information about a common wideband wireless channel from wireless signals that are received by a radio node of a first wireless network (at block 702). The method 700 includes generating, with the server, a first Spectrum Usability Mask based on the spectrum occupancy information, the first Spectrum Usability Mask indicating usable spectral segments in the common wideband wireless channel with respect to a location of the radio node (at block 704). The method 700 includes transmitting, with the server, the first Spectrum Usability Mask to a plurality of other radio nodes in the first wireless network (at block 706). The method 700 also includes transmitting, with the server, traffic and control information to a plurality of destination radio nodes in the first wireless network using transmit signals based on the first Spectrum Usability Mask (at block 708).

Figure 8:
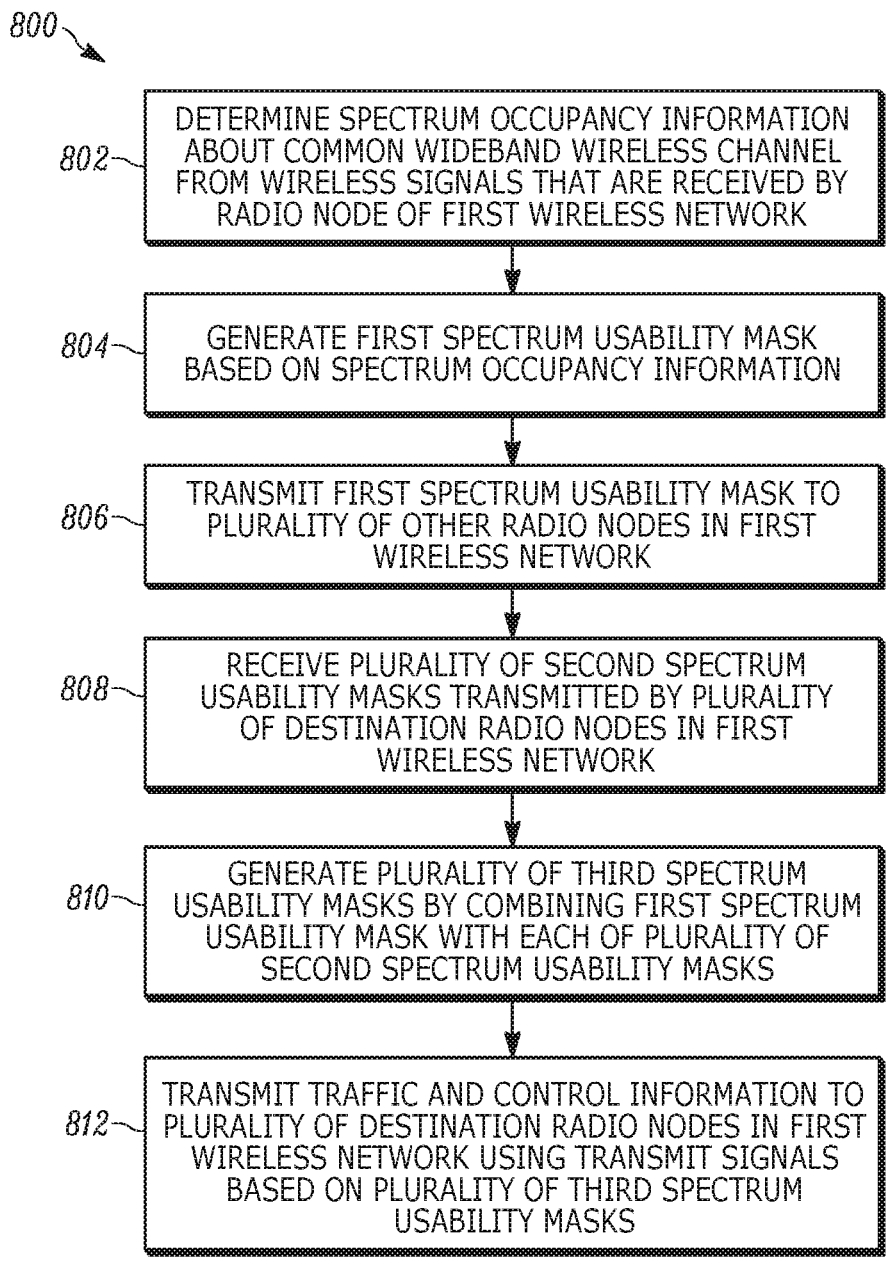
FIG. 8 is a block diagram illustrating a third wireless communication method.

FIG. 8 is a block diagram illustrating a third wireless communication method 800. As illustrated in FIG. 8, the method 800 includes determining, with a server, spectrum occupancy information about a common wideband wireless channel from wireless signals that are received by a radio node of a first wireless network (at block 802). The method 800 includes generating, with the server, a first Spectrum Usability Mask based on the spectrum occupancy information, the first Spectrum Usability Mask indicating usable spectral segments in the common wideband wireless channel with respect to a location of the radio node (at block 804). The method 800 includes transmitting, with the server, the first Spectrum Usability Mask to a plurality of other radio nodes in the first wireless network (at block 806). The method 800 includes receiving, with the server, a plurality of second Spectrum Usability Masks transmitted by a plurality of destination radio nodes in the first wireless network (at block 808). The method 800 includes generating, with the server, a plurality of third Spectrum Usability Masks by combining the first Spectrum Usability Mask with each of the plurality of second Spectrum Usability Masks (at block 810). The method 800 also includes transmitting, with the server, traffic and control information to the plurality of destination radio nodes in the first wireless network using transmit signals based on the plurality of third Spectrum Usability Masks (at block 812).

Figure 9:
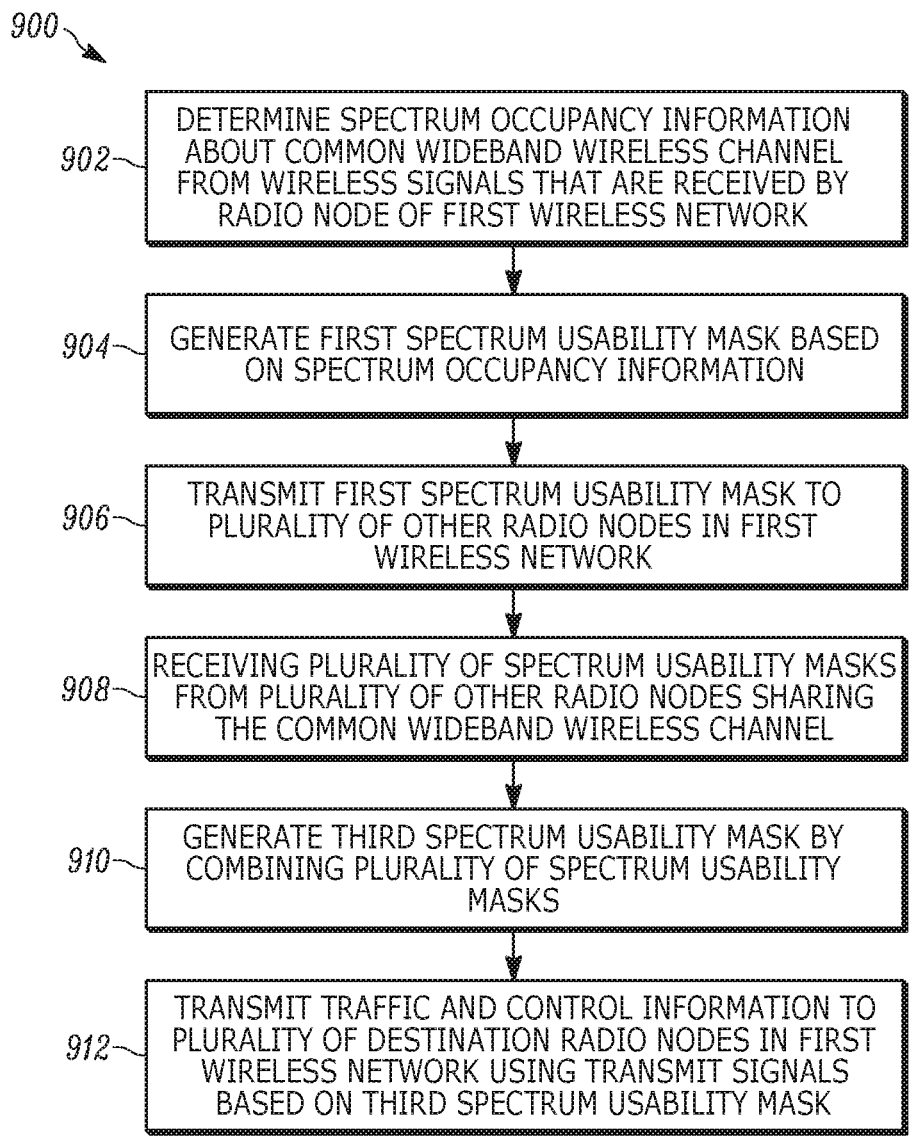
FIG. 9 is a block diagram illustrating a fourth wireless communication method.

FIG. 9 is a block diagram illustrating a fourth wireless communication method 900. As illustrated in FIG. 9, the method 900 includes determining, with a server, spectrum occupancy information about a common wideband wireless channel from wireless signals that are received by a radio node of a first wireless network (at block 902). The method 900 includes generating, with the server, a first Spectrum Usability Mask based on the spectrum occupancy information, the first Spectrum Usability Mask indicating usable spectral segments in the common wideband wireless channel with respect to a location of the radio node (at block 904). The method 900 includes transmitting, with the server, the first Spectrum Usability Mask to a plurality of other radio nodes in the first wireless network (at block 906). The method 900 includes receiving, with the server, a plurality of Spectrum Usability Masks from the plurality of other radio nodes, belonging to the first wireless network as well as to networks other than the first wireless network, and sharing the common wideband wireless channel (at block 908). The Spectrum Usability Masks of radio nodes not belonging to the first wireless network may be communicated to a Gateway Radio Node of the first wireless network via a backchannel collaboration link as shown in FIG. 2. The method 900 includes generating, with the server, a third Spectrum Usability Mask by combining the plurality Spectrum Usability Masks (at block 910), including those that pertain to the first wireless network and those that pertain to other networks. The method 900 also includes transmitting, with the server, traffic and control information to a plurality of destination radio nodes in the first wireless network using transmit signals based on the third Spectrum Usability Mask (at block 912).

Figure 10:
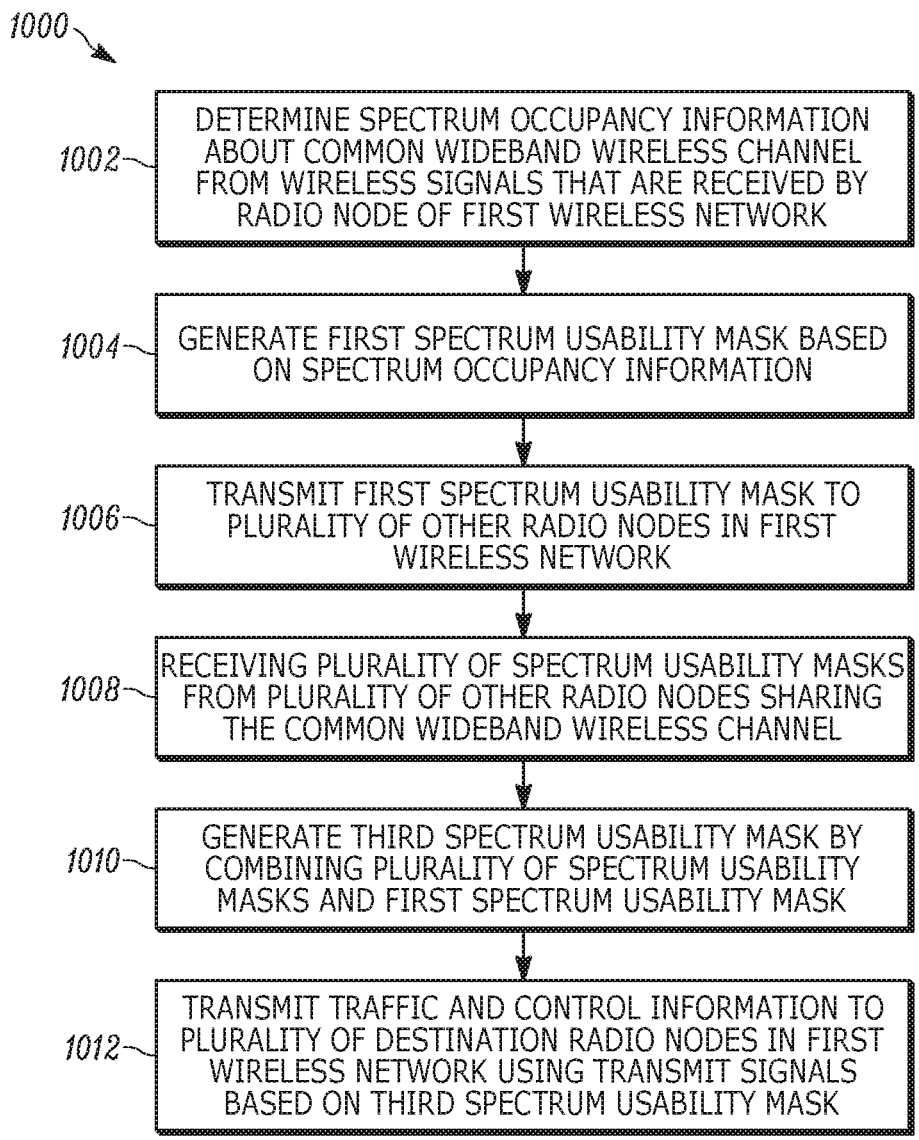
FIG. 10 is a block diagram illustrating a fifth wireless communication method.

FIG. 10 is a block diagram illustrating a fifth wireless communication method 1000. As illustrated in FIG. 10, the method 1000 includes determining, with a server, spectrum occupancy information about a common wideband wireless channel from wireless signals that are received by a radio node of a first wireless network (at block 1002). The method 1000 includes generating, with the server, a first Spectrum Usability Mask based on the spectrum occupancy information, the first Spectrum Usability Mask indicating usable spectral segments in the common wideband wireless channel with respect to a location of the radio node (at block 1004). The method 1000 includes transmitting, with the server, the first Spectrum Usability Mask to a plurality of other radio nodes in the first wireless network (at block 1006). The method 1000 includes receiving, with the server, a plurality of Spectrum Usability Masks from the plurality of other radio nodes sharing the common wideband wireless channel (at block 1008). The method 1000 includes generating, with the server, a third Spectrum Usability Mask by combining the plurality Spectrum Usability Masks and the first Spectrum Usability Mask (at block 1010). The method 1000 also includes transmitting, with the server, traffic and control information to a plurality of destination radio nodes in the first wireless network using transmit signals based on the third Spectrum Usability Mask (at block 1012).

Thus, the present disclosure provides, among other things, wireless communication systems with code-division multiple access and interference avoidance. Various features and advantages of the present disclosure are set forth in the following claims.

What is claimed is:

1. A wireless communication system comprising:
a plurality of transmitters; and
a plurality of receivers,
wherein at least one transmitter of the plurality of transmitters is configured to
detect unoccupied segments of spectrum occupancy of interference at one of the plurality of receivers, and
spread a power of a transmitted signal non-uniformly across a channel bandwidth that is much wider than an information bandwidth of the transmitted signal while occupying a plurality of non-contiguous spectral segments that correspond to the unoccupied segments of the spectrum occupancy of the interference at the one of the plurality of receivers, and
wherein at least one receiver of the plurality of receivers is configured to
perform a demodulation process by coherently integrating energy of the transmitted signal over the plurality of non-contiguous spectral segments.

2. The wireless communication system of claim 1, wherein, for a given transmit power, a demodulation performance at the at least one receiver is substantially independent of a plurality of spectral segments occupied by the transmitted signal.

3. A wireless communication system comprising:
a plurality of radio nodes of a first wireless network, each radio node of the plurality of radio nodes is configured to
transmit wireless signals to other radio nodes in the first wireless network, and
receive wireless signals from the other radio nodes in the first wireless network, the first wireless network sharing a common wideband wireless channel with at least one of a plurality of other wireless networks,
wherein at least one radio node of the plurality of radio nodes of the first wireless network includes
a spectrum sensing processor that is configured to determine spectrum occupancy information about the common wideband wireless channel from the wireless signals that are received by the at least one radio node,
a Spectrum Usability Mask processor that is configured to generate a first Spectrum Usability Mask based on the spectrum occupancy information, the first Spectrum Usability Mask indicating usable spectral segments in the common wideband wireless channel with respect to a location of the at least one radio node,
a broadcast and control channel processor that is configured to transmit the first Spectrum Usability Mask to the other radio nodes in the first wireless network, and
a traffic data channel processor and the broadcast and control channel processor are configured to transmit traffic and control information to a plurality of destination radio nodes in the first wireless network.

4. The wireless communication system of claim 3, wherein the broadcast and control channel processor is further configured to receive a second Spectrum Usability Mask of a destination radio node in the first wireless network.

5. The wireless communication system of claim 4, wherein the plurality of destination radio nodes includes the destination radio node, and wherein the wireless signals transmitted to the destination radio node have spectra that are substantially limited to unmasked spectral segments of the second Spectrum Usability Mask.

6. The wireless communication system of claim 5, wherein, to transmit the traffic and control information to the plurality of destination radio nodes in the first wireless network, the traffic data channel processor and the broadcast and control data channel processor are configured to
collect a sequence of information to be transmitted into a source vector comprising M complex symbols,
generate a spreading matrix of pseudorandom sequences, the spreading matrix comprising M columns and N rows,
post-multiply the spreading matrix by the source vector to generate an N-element source vector which is represented in the frequency-domain,
multiply the N-element source vector in an element-by-element manner with the second Spectrum Usability Mask to generate a second N-element source vector that is masked according to masked elements of the second Spectrum Usability Mask,
perform an N-point Inverse fast Fourier transform (IFFT) operation on the second N-element source vector to generate a third N-element source vector that is represented in the time-domain, the third N-element source vector comprising complex-baseband transmit symbols,
perform an automatic gain control (AGC) operation on an amplitude of the third N-element source vector to generate a fourth N-element source vector, wherein an average power of the fourth N-element source vector is averaged over all elements, is substantially constant, and is independent of the number of masked elements in the second Spectrum Usability Mask,
frequency translate the fourth N-element source vector to a desired radio frequency, and
transmit the fourth N-element source vector at the desired radio frequency and at a desired power level.

7. The wireless communication system of claim 6, wherein the rows of the spreading matrix are linearly independent.

8. The wireless communication system of claim 3, wherein a received signal is demodulated with similar performance after masking out a plurality of spectral segments in the transmitted wireless signals.

9. The wireless communication system of claim 4, wherein the traffic data channel processor and the broadcast and control channel processor are further configured to
generate a third Spectrum Usability Mask by combining the first Spectrum Usability Mask and the second Spectrum Usability Mask, wherein all spectral segments that are masked in either the first Spectrum Usability Mask or the second Spectrum Usability Mask are also masked in the third Spectrum Usability Mask,
wherein the plurality of destination radio nodes includes the destination radio node, and wherein the wireless signals transmitted to the destination radio node have spectra that are substantially limited to unmasked segments of the third Spectrum Usability Mask.

10. The wireless communication system of claim 3, wherein the traffic data channel processor and the broadcast and control data channel processors are further configured to transmit the traffic and control information to the plurality of destination radio nodes in the first wireless network based on the first Spectrum Usability Mask.

11. The wireless communication system of claim 3, wherein the broadcast and control channel processor is further configured to receive a plurality of second Spectrum Usability Masks from other radio nodes sharing the common wideband wireless channel, and
  wherein the spectrum usability mask processor is further configured to
    generate a plurality of third Spectrum Usability Masks by combining the first Spectrum Usability Mask with each of the plurality of second Spectrum Usability Masks, and
    transmit the traffic and control information to the plurality of destination radio nodes in the first wireless network based on the plurality of third Spectrum Usability Masks.

12. The wireless communication system of claim 3, wherein the traffic data channel processor and the broadcast and control channel processor are further configured to receive and demodulate a signal from a source radio node via a software-defined radio.

13. The wireless communication system of claim 12, wherein to receive and demodulate the signal from the source radio node, the traffic data channel processor and the broadcast and control channel processor of a receiving radio node are configured to
  frequency translate the signal from a real, radio frequency (RF) form to a complex baseband form,
  collect a plurality of received complex symbols to generate a first N-element received vector that is in the time-domain,
  perform an N-point Fast Fourier transform (FFT) on the first N-element received vector to generate a second N-element received vector that in the frequency-domain,
  multiply the second N-element received vector by the first Spectrum Usability Mask to generate a third N-element received vector with one or more masked symbols in the third N-element received vector being replaced by a zero value,
  remove the one or more masked symbols in the third N-element received vector to generate an L-element received vector, wherein L is less than or equal to N and M,
  generate a post-mask spreading matrix of pseudorandom sequences, wherein the signal transmitted by the source radio node is based on the post-mask spreading matrix,
  reduce a dimension of the post-mask spreading matrix from M columns and N rows to M columns and L rows, wherein the rows that correspond to masked elements of the first Spectrum Usability Mask are removed,
  generate an M-row by L-column pseudo-inverse matrix of the post-mask spreading matrix,
  multiply the M-row by L-column pseudo-inverse matrix by the L-element received vector to generate an M-element received vector comprising complex receive symbols, and
  quadrature amplitude demodulate and forward error correction (FEC) decode the M-element received vector into a K-element block of information bits.

14. The wireless communication system of claim 3, wherein the at least one radio node further includes
  an application data processor, and
  a software-defined radio with an antenna array, wherein the antenna array is configured to receive the wireless signals from the plurality of radio nodes, and wherein the software-defined radio is configured to
  frequency translate the wireless signals to digital, complex-baseband form, and input the digital, complex-baseband form of the wireless signals to the application data processor.

15. A radio node comprising:
  a server including circuitry and memory, the server is configured to
    determine spectrum occupancy information about a common wideband wireless channel from wireless signals that are received by the radio node,
    generate a first Spectrum Usability Mask based on the spectrum occupancy information, the first Spectrum Usability Mask indicating usable spectral segments in the common wideband wireless channel with respect to a location of the radio node,
    transmit the first Spectrum Usability Mask to a plurality of other radio nodes in a first wireless network, and
    transmit traffic and control information to a plurality of destination radio nodes in the first wireless network using transmit signals.

16. The radio node of claim 15, wherein the server is further configured to receive a second Spectrum Usability Mask of a destination radio node in the first wireless network.

17. The radio node of claim 16, wherein the plurality of destination radio nodes includes the destination radio node, and wherein the transmit signals that are transmitted to the destination radio node have spectra that are substantially limited to unmasked spectral segments of the second Spectrum Usability Mask.

18. The radio node of claim 17, wherein, to transmit the traffic and control information to the plurality of destination radio nodes in the first wireless network using the transmit signals, the server is configured to
  collect a sequence of information to be transmitted into a source vector comprising M complex symbols,
  generate a spreading matrix of pseudorandom sequences, the spreading matrix comprising M columns and N rows,
  post-multiply the spreading matrix by the source vector to generate an N-element source vector which is represented in the frequency-domain,
  multiply the N-element source vector in an element-by-element manner with the second Spectrum Usability Mask to generate a second N-element source vector that is masked according to masked elements of the second Spectrum Usability Mask,
  perform an N-point Inverse fast Fourier transform (IFFT) operation on the second N-element source vector to generate a third N-element source vector that is represented in the time-domain, the third N-element source vector comprising complex-baseband transmit symbols,
  perform an automatic gain control (AGC) operation on an amplitude of the third N-element source vector to generate a fourth N-element source vector, wherein an average power of the fourth N-element source vector is averaged over all elements, is substantially constant, and is independent of the number of masked elements in the second Spectrum Usability Mask,
  frequency translate the fourth N-element source vector to a desired radio frequency, and
  transmit the fourth N-element source vector using the transmit signals at the desired radio frequency and at a desired power level.

19. The radio node of claim 18, wherein the rows of the spreading matrix are linearly independent.

20. The radio node of claim 16, wherein the server is further configured to
generate a third Spectrum Usability Mask by combining the first Spectrum Usability Mask and the second Spectrum Usability Mask, wherein all spectral segments that are masked in either the first Spectrum Usability Mask or the second Spectrum Usability Mask are also masked in the third Spectrum Usability Mask, and
wherein the plurality of destination radio nodes includes the destination radio node, and wherein the transmit signals that are transmitted to the destination radio node have spectra that are substantially limited to unmasked segments of the third Spectrum Usability Mask.

21. The radio node of claim 15, wherein the server is further configured to transmit the traffic and control information to the plurality of destination radio nodes in the first wireless network based on the first Spectrum Usability Mask.

22. The radio node of claim 15, wherein the server is further configured to receive a plurality of Spectrum Usability Masks from other radio nodes sharing the common wideband wireless channel, and
wherein the server is further configured to
generate a plurality of third Spectrum Usability Masks by combining the first Spectrum Usability Mask with each of the plurality of Spectrum Usability Masks, and
transmit the traffic and control information to each of the plurality of destination radio nodes in the first wireless network based on one or more of the plurality of third Spectrum Usability Masks.

23. The radio node of claim 22, wherein the plurality of Spectrum Usability Masks received from the other radio nodes sharing the common wideband wireless channel include radio nodes that do not belong to the first wireless network, and the radio nodes that do not belong to the first wireless network share Spectrum Usability Masks with a Gateway Radio Node of the first wireless network via a collaboration data channel.

24. The radio node of claim 15, wherein the server is further configured to receive and demodulate a signal from a source radio node via a software-defined radio.

25. The radio node of claim 24, wherein to receive and demodulate the signal from the source radio node, the server is configured to
frequency translate the signal from a real, radio frequency (RF) form to a complex baseband form,
collect a plurality of received complex symbols to generate a first N-element received vector that is in the time-domain,
perform an N-point Fast Fourier transform (FFT) on the first N-element received vector to generate a second N-element received vector that in the frequency-domain,
multiply the second N-element received vector by the first Spectrum Usability Mask to generate a third N-element received vector with one or more masked symbols in the third N-element received vector being replaced by a zero value,
remove the one or more masked symbols in the third N-element received vector to generate an L-element received vector, wherein L is less than N and M,
generate a post-mask spreading matrix of pseudorandom sequences, wherein the signal transmitted by the source radio node is based on the post-mask spreading matrix,
reduce a dimension of the post-mask spreading matrix from M columns and N rows to M columns and L rows, wherein the rows that correspond to masked elements of the first Spectrum Usability Mask are removed,
generate an M-row by L-column pseudo-inverse matrix of the post-mask spreading matrix,
multiply the M-row by L-column pseudo-inverse matrix by the L-element received vector to generate an M-element received vector comprising complex receive symbols, and
quadrature amplitude demodulate and forward error correction (FEC) decode the M-element received vector into a K-element block of information bits.

26. The radio node of claim 24, further comprising a controller, the controller is configured to apply machine learning principles to determine operational strategies.

27. A wireless communication method comprising:
determining, with a server, spectrum occupancy information about a common wideband wireless channel from wireless signals that are received by a radio node of a first wireless network;
generating, with the server, a first Spectrum Usability Mask based on the spectrum occupancy information, the first Spectrum Usability Mask indicating usable spectral segments in the common wideband wireless channel with respect to a location of the radio node;
transmitting, with the server, the first Spectrum Usability Mask to a plurality of other radio nodes in the first wireless network;
receiving, with the server, a plurality of second Spectrum Usability Masks transmitted by a plurality of destination radio nodes in the first wireless network; and
transmitting, with the server, traffic and control information to the plurality of destination radio nodes in the first wireless network using transmit signals based on the plurality of second Spectrum Usability Masks.

28. A non-transitory computer-readable medium comprising instructions that, when executed by a server, cause the server to perform a set of operations, the set of operations comprising:
determining spectrum occupancy information about a common wideband wireless channel from wireless signals that are received by a radio node of a first wireless network;
generating a first Spectrum Usability Mask based on the spectrum occupancy information, the first Spectrum Usability Mask indicating usable spectral segments in the common wideband wireless channel with respect to a location of the radio node;
transmitting the first Spectrum Usability Mask to a plurality of other radio nodes in the first wireless network;
receiving a plurality of second Spectrum Usability Masks transmitted by a plurality of destination radio nodes in the first wireless network; and
transmitting traffic and control information to the plurality of destination radio nodes in the first wireless network using transmit signals based on the plurality of second Spectrum Usability Masks.

* * * * *